(12) United States Patent
Arai

(10) Patent No.: US 6,221,302 B1
(45) Date of Patent: Apr. 24, 2001

(54) METHOD OF MAKING SAMPLE IN FORM OF OUTLINE DRAWING SHEET

(76) Inventor: Takeshi Arai, c/o Marchen World Company Limited 7-11 Oaza Kamihiroya, Turugashima-shi, Saitama-ken (JP)

(*) Notice: Subject to any disclaimer, the term of this patent is extended or adjusted under 35 U.S.C. 154(b) by 0 days.

(21) Appl. No.: 09/118,272

(22) Filed: Jul. 17, 1998

(30) Foreign Application Priority Data

Mar. 6, 1998 (JP) .................................................. 10-073312

(51) Int. Cl.[7] .................................................. B29C 41/22
(52) U.S. Cl. .................. 264/496; 264/250; 264/255; 264/267
(58) Field of Search .................................. 264/496, 132, 264/246, 250, 255, 267

(56) References Cited

U.S. PATENT DOCUMENTS 4,411,855 * 10/1983 Fiebig, Jr. et al. .................. 264/219
5,447,758 * 9/1995 Pelletier .................................. 427/511
5,985,376 * 11/1999 Kamen .................................. 427/504

FOREIGN PATENT DOCUMENTS

362258773A * 11/1987 (JP) .

* cited by examiner

Primary Examiner—Jan H. Silbaugh
Assistant Examiner—Edmund H. Lee
(74) Attorney, Agent, or Firm—Israel Gopstein

(57) ABSTRACT

A method of making a sample in a form of an outline drawing sheet, comprises the steps of preparing a plastic sheet 1 used for a base member, a screen for screen-printing, having a screen mesh 5 corresponding to a border line 2a for an outline drawing sheet, and a squeegee; placing printing ink 6 on the screen with the screen closely contacted to the plastic sheet; squeezing out the printing ink 6 through the screen mesh 5 by using the squeegee 7 to print a frame 2 constituting the border line for the outline drawing sheet 1, on the plastic sheet; applying paint 14 having a desired color on the plastic sheet 1 at an inside of the frame 2 after the frame 2 has been cured, to thereby form a colored portion 15; and stripping the frame 2 and the colored portion 15 integrated with the frame 2, from the plastic sheet 1.

4 Claims, 5 Drawing Sheets

METHOD OF MAKING SAMPLE IN FORM OF OUTLINE DRAWING SHEET

BACKGROUND OF THE INVENTION

1. Field of the Invention

The present invention relates to a method of making a sample in a form of an outline drawing sheet which can be pasted on furniture, room walls, window glasses, and the like merely by hand, and can be easily tore by hand, and which is suitably used as indoor ornaments, children's playing tools, and the like.

2. Description of the Related Art

Outline drawing sheets are conventionally well known, these outline drawing sheets each comprises a paper sheet on which boarder lines of picture/pattern are drawn, and one kind of children's playing tools by which children amuse themselves with coloring insides of the border lines by various colors.

Meanwhile, samples in a form of an outline drawing sheet of plastic material which are analogous to the conventional outline drawing sheets are placed on sale.

These samples in the form of the outline drawing sheet are made by the following method:

That is, frames constituting border lines of picture/pattern is made by drawing the border lines by a paste-like plastic material and then curing it, or by punching the plastic sheet along the border lines by a cutter. Then, the frames are closely contacted to a top surface of the plastic sheet as a base material, leaving no space. Next, paint having a desired color is applied to the top surface of the plastic sheet at insides of the frames, to thereby form colored portions, and then the colored portions are dried and then cured. Further, the frames and the colored portions integral with the frames are torn from the plastic sheet, which provides a substantially plate-like sample in a form of an outline drawing sheet in which the frames and the colored portions are integrated with one another as described above.

It is without saying that, for example, children can amuse themselves with making this sample in a form of an outline drawing sheet like the conventional outline drawing sheet, and that the sample can be easily pasted on any places, which enables children to enjoy using it as an ornament such as a stained glass.

However, the above-mentioned method of making the sample in the form of the outline drawing sheet has the following problems:

(1) There are required two steps comprising a step of previously making the frame constituting the border lines of the picture/pattern as a single piece by the above-mentioned method, and a step of closely contacting the frame to the top surface of the plastic sheet, which requires much labor and time in making the sample.

(2) Also, it is difficult to make a frame which is flexible, thin and small. Moreover, the frame is hard to be closely contacted to the top surface of the plastic sheet at a predetermined location, and it is apt to be deformed at that time.

(3) Further, when the paste-like paints of various colors are applied to the top surface of the plastic sheet at the insides of the frames, the paints are apt to be leaked from between the plastic sheet and the frames.

(4) Still further, in order to form the picture of, for example, an animal by frames by the conventional method, there are required connection portions for connecting frames of both eyes to the other frame. However, the connecting portions are not needed and hence must be cut when the frames are closely contacted to the plastic sheet.

The present invention has been made to overcome the above-mentioned various problems of the related art. It is therefore an object of the invention to provide a method of making a sample in a form of an outline drawing sheet, which is capable of closely contacting the frames to a plastic sheet by a single process by the screen printing technique, thereby resulting in remarkable improvement of the making efficiency, and enabling thin and small frames to be easily formed, enabling the frames to be contacted to the plastic sheet at a predetermined location without being deformed, and preventing paste-like paint applied to insides of the frames from being leaked, and eliminating the need for providing the connection portions in the frames and then eliminating the need for the cutting work thereof.

MEANS FOR SOLVING THE PROBLEMS

In order to attain the above-mentioned object, the invention provides a method of making a sample in a form of an outline drawing sheet, comprising the steps of preparing a plastic sheet used for a base member, a screen for screen-printing, having a screen mesh corresponding to a border line for an outline drawing sheet, and a squeegee; placing a printing ink on the screen with the screen closely contacted to the plastic sheet, squeezing out the printing ink through the screen mesh by using the squeegee to print a frame constituting the border lines for the outline drawing on the plastic sheet, applying paint having a desired color on the plastic sheet at an inside of the frame after the frame has been cured, to thereby form a colored portion, and stripping the frame and the colored portion integrated with the frame, from the plastic sheet.

The nature, utility and further features of the present invention will be more clearly from the following detailed description with reference to a preferred embodiment of the present invention when read in conjunction with the accompanying drawings briefly described below.

DETAILED DESCRIPTION OF THE PREFERRED EMBODIMENT

The invention will now be described in detail with reference to the drawings showing respective embodiments.

Figure 1:
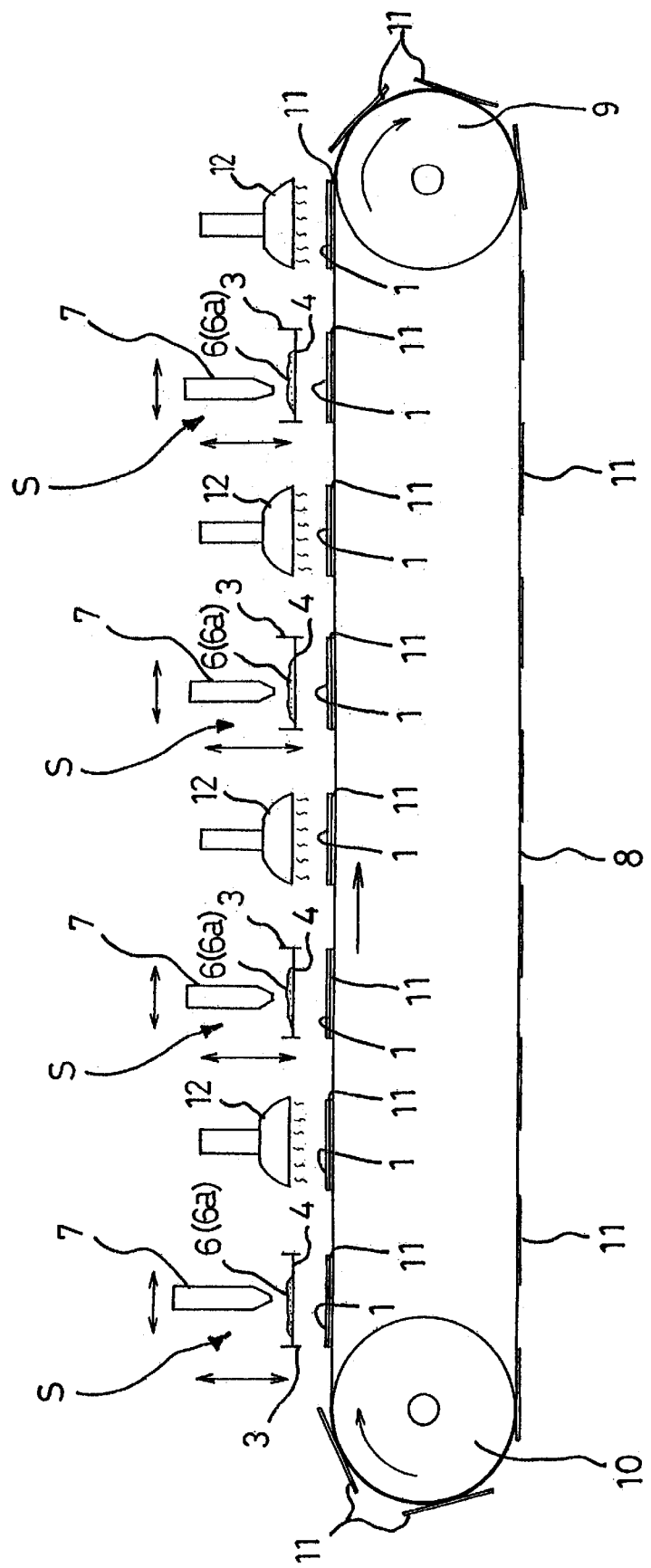
FIG. 1 is an explanation view showing a process of screen-printing frames on a top surface of a plastic sheet in a method of making a sample in a form of an outline drawing sheet, in accordance with the present invention.
Figure 2:
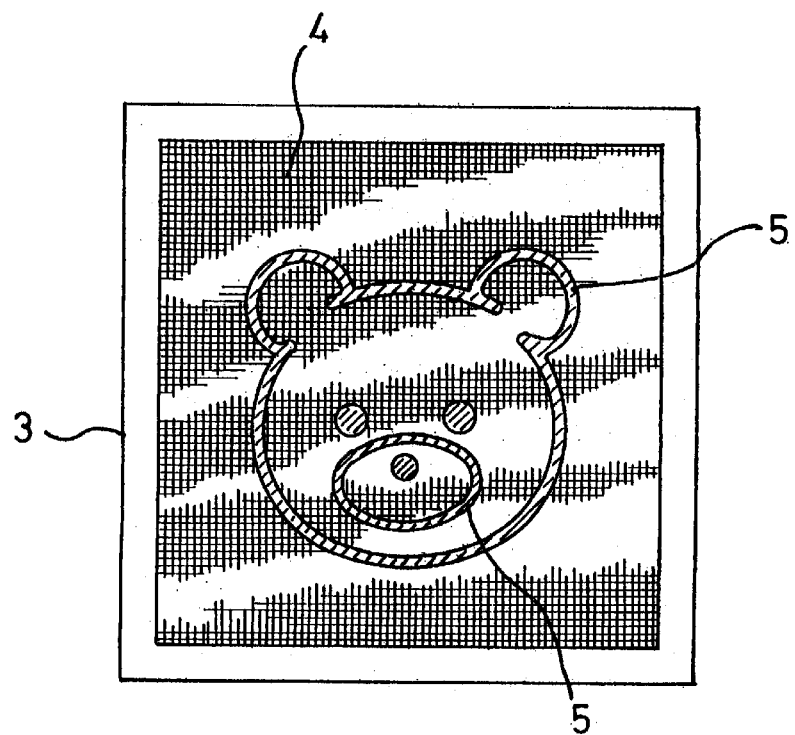
FIG. 2 is a plan view of a screen used in the above-mentioned process.
Figure 3:
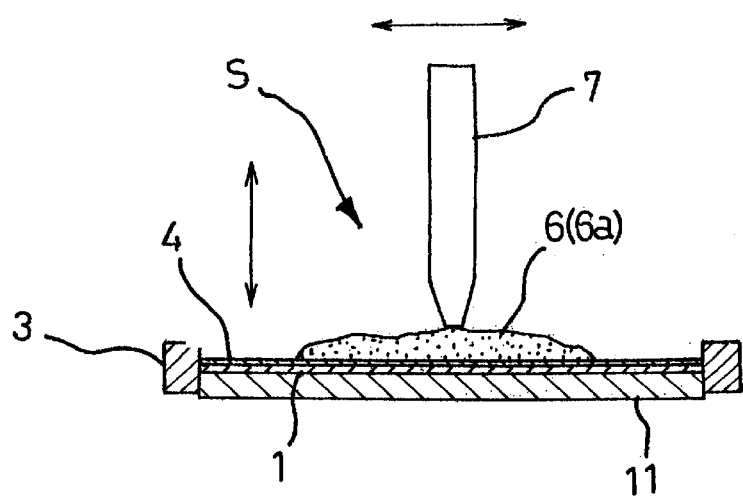
FIG. 3 is an explanation view showing a state in which the screen-printing is carried out with a squeegee abutted against a top surface of a screen in the above-mentioned process.
Figure 4:
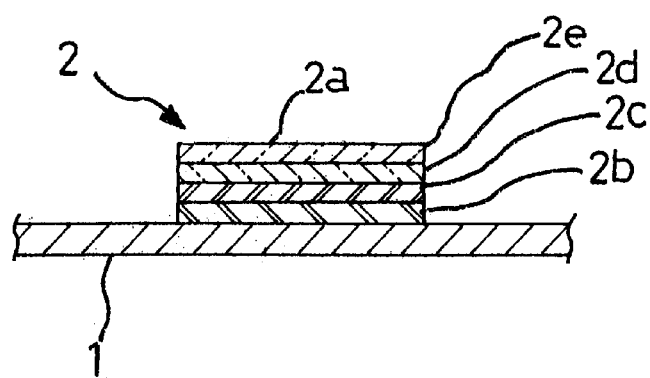
FIG. 4 is a partially enlarged section view showing a state in which the frame is printed on the top surface of the plastic sheet several (four) times.

FIG. 1 is an explanation view showing a process of screen-printing frames on a top surface of a plastic sheet in a method of making a sample in a form of an outline drawing sheet, in accordance with the present invention;

FIG. 2 is a plan view of a screen used in the above-mentioned process; FIG. 3 is an explanation view showing a state in which the screen-printing is carried out with a squeegee abutted against a top surface of a screen in the above-mentioned process; FIG. 4 is a partially enlarged section view showing a state in which the frame is printed on the top surface of the plastic sheet several (four) times; and FIGS. 5 to 9 are explanation views showing making processes after the screen-printing.

In the drawings, reference numeral 1 designates a plastic sheet for a base material, and 2 a frame closely contacting to a top surface of the plastic sheet so as to be able to be torn thereafter.

The plastic sheet 1 may be made of, for example, a polyethylene resin sheet, a polypropylene resin sheet, and a polyamide resin sheet. Any other materials may be employed insofar as it has some degree of heat resistance, flexibility, and tear-ability with the frame 2. The plastic sheet 1 is formed by cutting a sheet of 0.3 to 1 mm-thick made of the above material into a suitable size and shape (rectangular in this embodiment, but circular or other shape is available.).

The frames 2 are formed by printing border lines 2a of an outline drawing on a top surface of the plastic sheet 1 by a screen printing machine S. Any pictures such as cartoon, animal picture, sight picture may be employed for the outline drawing.

That is, as shown in FIG. 2, screen meshes 5 corresponding to the border lines 2a of the outline drawing are formed on a screen 4 stretched on a rectangular frame 3 of the screen printing machine S. The screen 4 is made of woven material of about 70 mesh of silk, plastic fiber, metal fiber, and the like having a fiber diameter of about 150 to 200 microns.

As shown in FIG. 3, printing ink 6 is placed on the screen 4 with the screen 4 closely contacted to the top surface of the plastic sheet 1, this printing ink 6 is pressed/rubbed by a leading end of a squeegee 7 to be squeezed out through the screen mesh 5, and then the frames 2 constituting the border lines 2a of the outline drawing are printed on the top surface of the plastic sheet 1.

Moreover, the squeegee 7 is made of a polyurethane rubber having a hardness of 60 to 70° (rather soft or middle hardness).

Any other kinds of the printing ink 6 can be employed insofar as it has a relatively good cure-ability, and has a good tear-ability with the plastic sheet 1 after being cured.

However, a method of applying the printing ink 6 is preferably to use a UV ink 6a made of a photo-curing resin as the printing ink 6, and to print it while dividing it into several parts, which enables the thickness of the printing ink 6 to be easily adjusted.

The UV ink 6a is made of a material in which a photo polymerization initiator, coloring matters, and auxiliaries for required characteristics are mixed to a binder of acrylateprepolymer, such as an polyurethane-acrylate system photo-curing resin.

FIG. 1 shows a process of printing the frame 2 constituting the border lines of the outline drawing on the top surface of the plastic sheet 1 by using the above-mentioned UV ink 6a. This process will be described hereinbelow in detail.

In FIG. 1, reference numeral 8 designates an endless conveyer belt stretched between a driving roller 9 and a driven roller 10 and then being rotation-driven intermittently in the direction shown by the arrow in the drawing, and 11 a number of work beds disposed an regular intervals all over the top surface of the endless conveyer belt 8.

Then, four screen printing machines 5 and four UV irradiating machines 12 are alternately disposed so as to be positioned above the respective work beds 11 from the left end to the right end of the endless conveyer belt 8, which enables the screen-printing and the UV irradiation to be repeated alternately.

In concrete terms, the plastic sheet 1 is placed on the top surface of the work bed 11 which is located on the left end of the endless conveyer belt 8, the screen printing machine S waiting above is lowered with the screen 4 closely contacted to the plastic sheet 1. In this state, the UV ink 6a placed on the screen 4 is squeezed out through the screen mesh 5 by pressing and then rubbing the UV ink 6a by the squeegee 7, thereby causing a first frame coating film to be printed on the top surface of the plastic sheet 1.

Then, when the endless conveyer belt 8 is rotation-driven and then the plastic sheet 1 which has undergone the printing is stopped at a lower portion of the next UV irradiation machine 12, irradiating UV on the first frame coating film 2b causes the coating film to cure.

Next, the endless conveyer belt 8 is further rotation-driven and then a second frame coating film 2c is printed on the first frame coating film 2b by the next screen printing machine S. Then, the coating film 2c is cured by the next UV irradiation machine 12. The same manner applies correspondingly to the respective works such as the printing and the curing of a third frame coating film 2d, and the printing and the curing of a fourth frame coating film 2e are repeated (See FIG. 4).

As described above, the frame 2 constituting the border lines 2a of the outline drawing having a predetermined thickness (0.2 to 1 mm) is formed on the top surface of the plastic sheet 1.

Meanwhile, the reason why the UV ink 6a is printed by stages (four times in this embodiment) is that the failure of the printing is decreased compared with a case in which the frame 2 having a predetermined thickness is printed at a time, and that the frame which is uniform in width and thickness can be easily obtained.

As described above, the frame 2 is formed by applying the UV ink 6a several times, increasing the thickness of the frame 2 to some extent, which makes it difficult for light to pass through the frame 2.

Accordingly, it is preferable to use the UV ink 6a which is colored lightly in order to improve the permeability of light.

Moreover, each of the UV irradiation machines 12 is of 5.5 kw type, and aims to carry out the irradiation from a location about 120 mm away from the surface to be printed, during 10 seconds.

Meanwhile, as shown in FIG. 1, the above-mentioned processes aim to continuously form the frame 2 on the top surface of the plastic sheet 1 by the use of a plurality of the screen printing machines and the UV irradiation machines; however, using a single screen machine and a single UV irradiation machine alternately without using the conveyer enables the frame 2 to be formed on the plastic sheet 1 as is the case with the above embodiment.

FIGS. 5 to 9 show the next processes.

Figure 5:
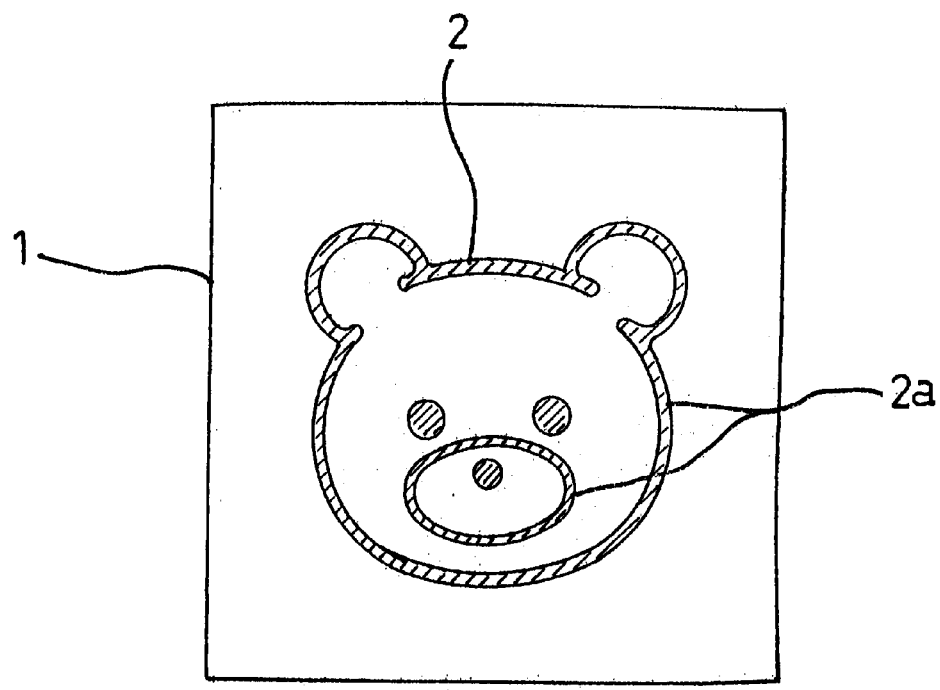
FIG. 5 is a plan view showing a state in which the frame is printed on the top surface of the plastic sheet.
Figure 6:
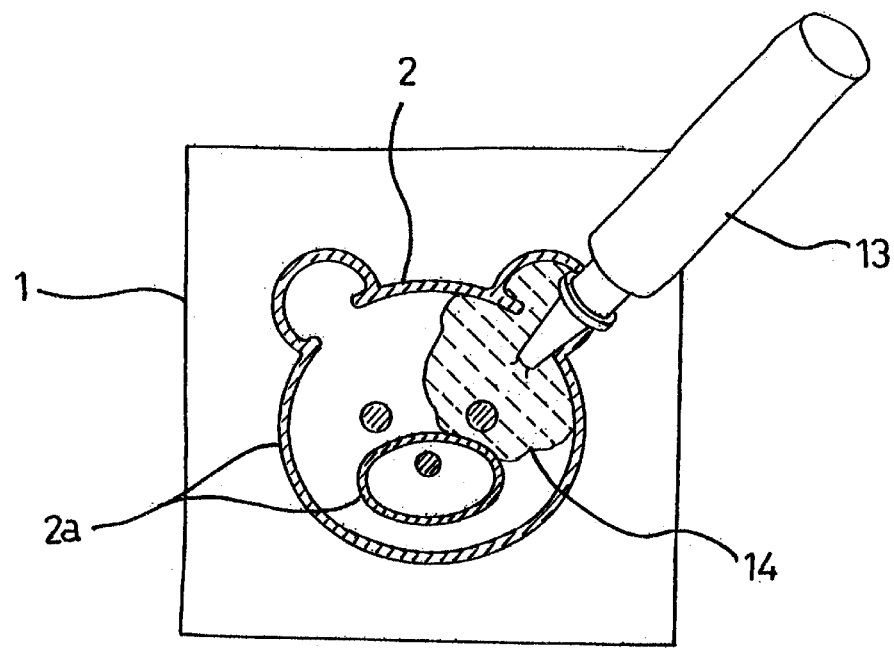
FIG. 6 is an explanation view of a process of coloring paint on the inside of the frame.
Figure 7:
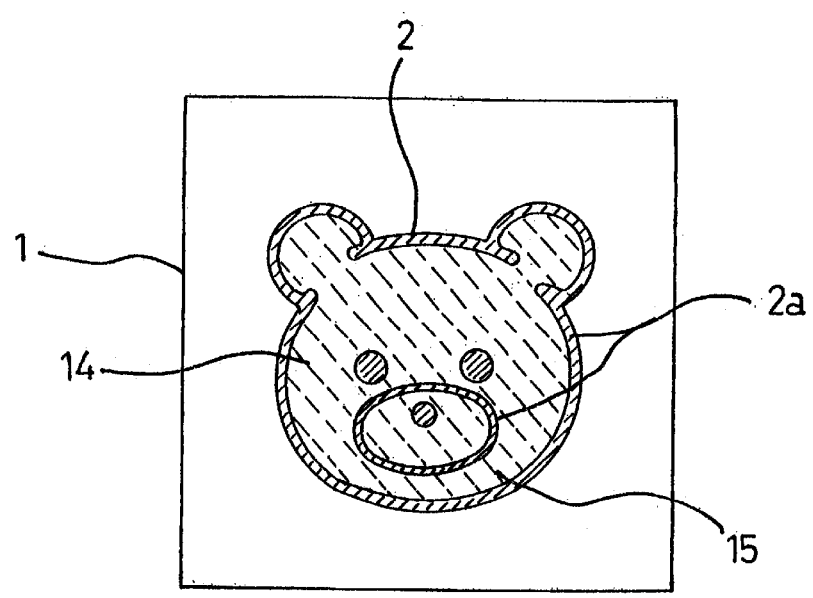
FIG. 7 is a plan view showing a state in which colored portions are formed all over the insides of the frames.
Figure 8:
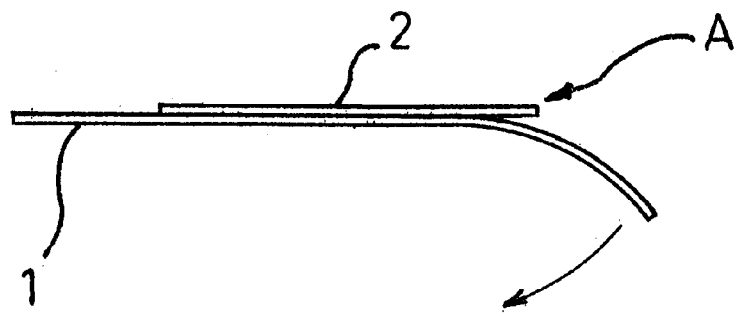
FIG. 8 is a front view showing a state in which a part of the frames and the colored portions is tore from the plastic sheet.
Figure 9:
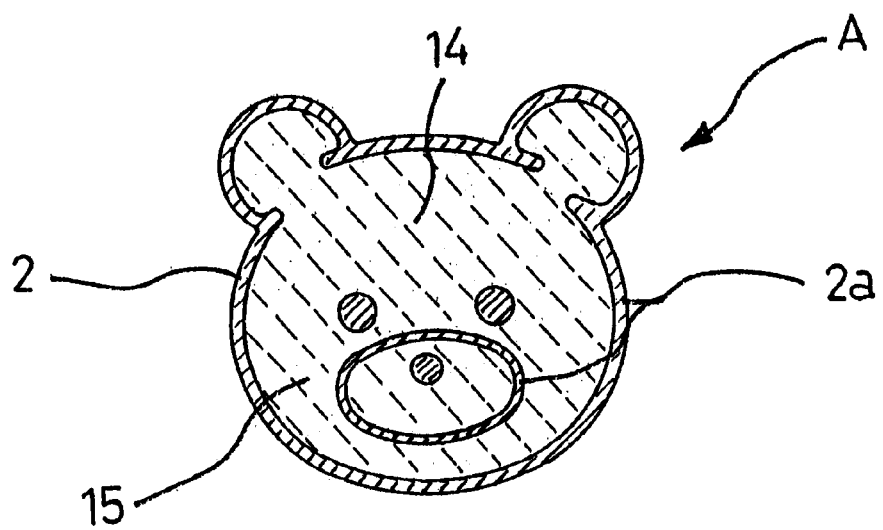
FIG. 9 is a plan view of a sample of an outline drawing sheet which is made in accordance with the present invention.

FIG. 5 is plan view showing a state in which the frame 2 is formed in a close contact condition on the top surface of the plastic sheet 1 due to the above-mentioned processes, FIG. 6 is an explanation view showing a state in which paint 14 is applied to the top surface of the plastic sheet 1 at insides of the frames 2 by using a tubular container 13; FIG. 7 is a plan view showing a state in which the application of the paint 14 is finished; FIG. 8 is a front view showing a state in which the sample is torn from the plastic sheet 1; and FIG. 9 is a plan view of a sample in a form of outline drawing sheet A.

The tubular container 13 is made of a soft material such that pressing the container 13 by fingers causes the paint 14 to be pressed out of a leading end of the container 13. Then, a plurality of tubular containers 13 are prepared, and the respective containers 13 are filled therein with various colored paint 14. Therefore, the operator can form the colored portions 15 of various colors by selecting and using desired tubular containers 13.

The paint 14 in the tubular container 13 is made of paint which is dried and cured when it is left as it is during two to three hours at a room temperature (15 to 25° C.), such as a acrylic acid ester methacrylic acid ester copolymer resin.

As described above, the colored portions 15 which are colored by the paint 14 of the desired colors are formed on the plastic sheet 1 at the insides of the frames 2, and then they are perfectly dried and cured; thereafter, the plastic sheet 1 is torn as shown in FIG. 8, which provides the sample in the form of outline drawing sheet A.

ADVANTAGE EFFECTS OF THE INVENTION

The present invention is constituted as described above; therefore it attains the effect described hereinbelow.

(1) The frame 2 constituting the border lines 2a of the outline drawing is integrally formed on the plastic sheet 1 by the use of the screen printing technique, which causes the outline drawing sheet including complicated border lines, the outline drawing sheet including remarkably minute border lines, and the line to be easily made in a short time.

(2) When the frame 2 is screen-printed on the plastic sheet 1, repeating the printing of the UV ink 6a and the UV irradiation alternately several times makes it easy to adjust the thickness of the frame 2, and provides the frame 2 having the uniform width and thickness.

(3) The frame 2 is not pasted on the plastic sheet 1 by hand, which prevents the frame 2 from being deformed during the work, which decreases the failure of making the sample.

(4) The frame 2 is closely contacted to the plastic sheet 1, which prevents the liquid or paste-like paint 13 from being leaked and then transferred to another frame when applying the paint 13.

(5) When drawing the animal, the screen printing technique is capable of forming independently both eyes, portions, which eliminates the need for the extra work of cutting the connection portions, as is distinct from the conventional manner.

(6) The sample can be pasted on the surfaces of furniture, room walls, window glasses, and cups, and the like without using paste, and moreover, they can be easily torn, which provides preferable children's game tools, and which prevents the contamination of the room.

The invention may be embodied in other specific forms without departing from the spirit or essential characteristics thereof. The present invention embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of making a sample in a form of an outline drawing sheet, comprising the steps of:

preparing a plastic sheet used for a base member, a screen for screen-printing, having a screen mesh corresponding to a border line for an outline drawing sheet, and a squeegee;

placing printing ink on said screen with said screen closely contacted to said plastic sheet;

squeezing out said printing ink through said screen mesh by using said squeegee to print a frame constituting said border lines for said outline drawing sheet, on said plastic sheet;

curing said frame applying paint having a desired color on said plastic sheet at an inside of said frame after said frame has been cured, to thereby form a colored portion; and stripping said frame and said colored portion integrated with said frame, from said plastic sheet.

2. A method of making a sample in a form of an outline drawing sheet, in accordance with claim 1, wherein said printing ink forming said frame which constitutes said border line for said outline drawing sheet and is printed on said plastic sheet for said base material comprises UV ink which is cured due to light radiation.

3. A method of making a sample in a form of an outline drawing sheet, in accordance with claim 1, further comprising a step of repeating several times the steps of placing said printing ink on said screen with said screen closely contacted to said plastic sheet;

squeezing out said printing ink through said screen mesh by using said squeegee to print said frame constituting said border lines for outline drawing sheet, on said plastic sheet; and radiating UV on said frame to cure said frame.

4. A method of making a sample in a form of an outline drawing sheet, in accordance with claim 2, further comprising a step of repeating several times the steps of:

placing said printing ink on said screen with said screen closely contacted to said plastic sheet;

squeezing out said printing ink through said screen mesh by using said squeegee to print said frame constituting said border lines for outline drawing sheet, on said plastic sheet; and radiating UV on said frame to cure said frame.

* * * * *